United States Patent [19]

Horike et al.

[11] 4,228,440
[45] Oct. 14, 1980

[54] INK JET PRINTING APPARATUS

[75] Inventors: Masanori Horike; Koichiro Jinnai; Kyuhachiro Iwasaki; Yutaka Kodama, all of Tokyo, Japan

[73] Assignee: Ricoh Company, Ltd., Tokyo, Japan

[21] Appl. No.: 970,736

[22] Filed: Dec. 18, 1978

[30] Foreign Application Priority Data

Dec. 22, 1977 [JP] Japan .................. 52-154638

[51] Int. Cl.² .............................................. G01D 15/18
[52] U.S. Cl. ..................................... 346/75; 310/317
[58] Field of Search ............. 346/75, 140 R; 310/317; 101/114, 335

[56] References Cited

U.S. PATENT DOCUMENTS

| 2,676,868 | 4/1954 | Jacob | 346/75 |
| 3,363,117 | 1/1968 | Mondot | 310/317 |
| 3,839,698 | 10/1974 | Ehrlich | 310/317 X |
| 3,943,847 | 3/1976 | Watanabe | 101/114 X |
| 4,005,435 | 1/1977 | Lundquist | 346/75 |
| 4,019,188 | 4/1977 | Hochberg | 346/75 |

Primary Examiner—Joseph W. Hartary
Attorney, Agent, or Firm—David G. Alexander

[57] ABSTRACT

Ink is fed to an ink jet printing head (12) from which it is ejected into a sheet of printing paper (19). A plurality of capacitive ultrasonic vibrators (29), (31) are provided inside the printing head (12) to atomize ink therein prior to ejection. The ultrasonic vibrators (29), (31) are connected in parallel with each other and also to an inductor (48) to constitute a resonant circuit. An electrical drive signal is applied to the resonant circuit, the frequency of the drive signal being equal to the resonant frequency of the resonant circuit.

7 Claims, 5 Drawing Figures

INK JET PRINTING APPARATUS

BACKGROUND OF THE INVENTION

The present invention relates to an ink jet printing apparatus which may be utilized in a facsimile transceiver, copying machine, oscillographic or chart recorder or the like.

In such an apparatus an ink ejection printing head is moved relative to a sheet of printing paper and ink is ejected from the head onto the paper. An electrostatic charge is applied to the ejected ink which passes between electrostatic deflection electrodes prior to impact with the paper. An electrical deflection signal applied to the deflection electrodes causes the jet of ink to be deflected to a desired degree to form an oscillographic trace, characters, etc.

The performance of the apparatus is increased tremendously if the ink is atomized in the ejection head. In order to achieve this effect, it has been known to dispose an ultrasonic vibrator in the head. The vibrator pressure or velocity modulates the ink and thereby atomizes the same.

However, such ultrasonic vibrators must be rather small in size for adequate mechanical response at the relatively high frequencies, such as 100 KHz, required for atomization of ink. The amplitude of oscillation, and therefore the displacement of ink produced by such a vibrator is generally inadequate to produce effective atomization. Increasing the size of the vibrator enables greater amplitude of oscillation but reduces the mechanical response of the vibrator at high frequencies to such an extent that a disproportionate amount of drive power is required to produce oscillation.

A prior art attempt to overcome this problem is to match the drive frequency to the mechanical resonance frequency of the head. However, such a match is unobtainable due to the large size of the head.

Another prior art expedient is to provide a plurality of small ultrasonic vibrators which are driven in sets. This generally overcomes the problems involved since the small vibrators may be driven at high frequency and mechanically connected in parallel so that the oscillation amplitudes are summed. However, a major problem remains even in this system in that any harmonics or distortions in the waveform of the drive signal have a major degrading effect on the mechanical response and therefore oscillation efficiency of the vibrators. A satisfactory means of eliminating such distortions has not been heretofore devised.

SUMMARY OF THE INVENTION

An ink jet printing apparatus embodying the present invention includes an ink ejection head and a plurality of capacitive ultrasonic vibrators disposed in the ink ejection head for atomizing ink therein. The vibrators are electrically connected in parallel. An inductor is connected to the ultrasonic vibrators to form a series or parallel resonant circuit therewith. Signal generator means apply an alternating electrical signal to the resonant circuit, the frequency of the electrical signal being equal to a resonant frequency of the resonant circuit.

It is an object of the present invention to provide an ink jet printing apparatus comprising an ink ejection head and a plurality of ultrasonic vibrators disposed in the head and an electronic circuit for driving the vibrators in such a manner as to provide sufficient mechanical oscillation frequency and amplitude for atomizing ink in the head.

It is another object of the present invention to provide an ink ejection printing apparatus and means for atomizing ink in an ink ejection head thereof regardless of the mechanical resonance frequency of the head.

It is another object of the present invention to provide an ink jet printing apparatus which provides improved performance and which can be manufactured efficiently and at low cost on a commercial production basis.

It is another object of the present invention to provide a generally improved in jet printing apparatus.

Other objects, together with the foregoing, are attained in the embodiments described in the following description and illustrated in the accompanying drawing.

DESCRIPTION OF THE PREFERRED EMBODIMENTS

While the ink jet printing apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
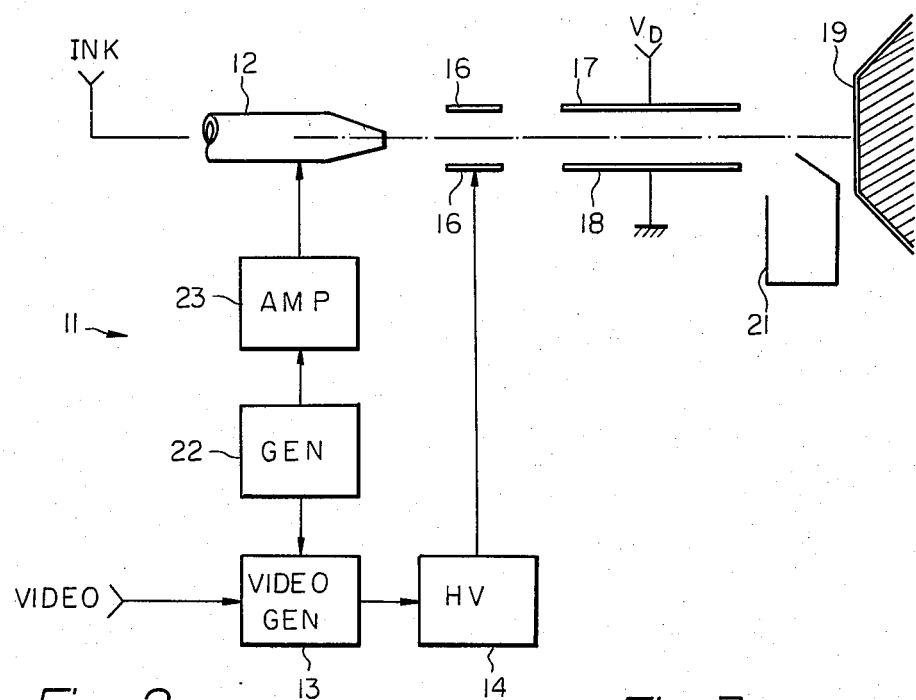
FIG. 1 is a schematic diagram of an ink jet printing apparatus of the present type.

Referring now to FIG. 1 of the drawing, an ink jet printing apparatus embodying the present invention is generally designated by the reference numeral 11 and comprises an ink jet or ejection head 12. A video signal is applied to a video deflection generator 13 which controls the output voltage of a high voltage generator 14. The generator 14 applies a high voltage to charging electrodes 16. A high voltage $V_D$ is applied to a deflection electrode 17 which is adjacent to a grounded deflection electrode 18.

Ink is ejected from the head 12 between the electrodes 16 which impart an electrostatic charge thereto. The magnitude of the voltage output of the generator 14 depends on the desired deflection of the ink jet and thereby determines the magnitude of electrostatic charge induced in the ink jet.

The ink jet then passes between the deflection electrodes 17 and 18 which deflect the ink jet from a straight path in proportion to the electrostatic charge of the jet. This is due to the electrostatic potential between the electrodes 17 and 18. The ink jet impacts against a moving sheet of paper 19 to print a pattern or character. A gutter 21 is disposed below the impact point of the ink jet to catch splattered ink.

A signal generator 22 generates an alternating electrical signal which is applied to the head 12 and also to the video generator 13 as a synchronization signal. The signal may have a sinusoidal, square, pulse or any other desired periodically alternating waveform. An amplifier 23 amplifies the signal before application to the head 12.

Figure 2:
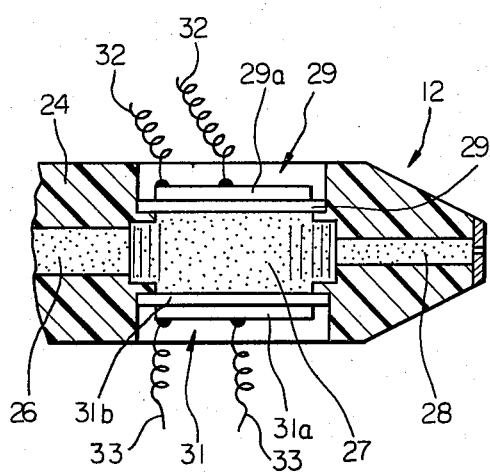
FIG. 2 is a sectional view of an ink ejection head of the present apparatus.

The signal from the generator 22 is applied to an ultrasonic vibrator means in the head 12 to atomize the ink therein prior to ejection onto the paper 19. The head 12 is illustrated in FIG. 2 as comprising a body 24, inlet passageway 26, atomization chamber 27 and nozzle 28 through which the ink flows. First and second ultrasonic vibrators 29 and 31 are provided at the periphery of the atomization chamber 27. The vibrator 29 comprises a piezoelectric element 29a which is connected to the amplifier 23 through leads 32. The element 29a is bonded to a flexible metal plate 29b which constitutes part of the wall of the atomization chamber 27. In an essentially similar manner, the vibrator 31 comprises a piezoelectric element 31a which is connected to the amplifier 23 through leads 33 and a plate 31b to which the element 31a is bonded.

In accordance with the present invention, the elements 29a and 31a are connected in parallel to the output of the amplifier 23. The signal applied to the elements 29a and 31a causes them to distort and flex the plates 29b and 31b respectively. Since the signal is periodic, it causes the plates 29b and 31b to oscillate at the applied frequency. This pressure modulates the ink causing it to separate or atomize into fine particles which are ejected through the nozzle 28.

The vibrators 29 and 31 are capacitive devices having typical capacitance values of 1000–2000 PFd. Where the frequency of the signal from the generator 22 is on the order of 100 KHz, the reactance of the elements 29 and 31 less than 1 K$\Omega$. The vibrators 29 and 31 require at least 100–200 V to accomplish atomization of the ink. In view of these requirements and also the degradation of performance caused by distortion of the signal applied to the vibrators 29 and 31, it is impossible to obtain acceptable performance in such an apparatus without the improvement of the present invention which will now be described in detail with reference to FIG. 4.

Figure 4:
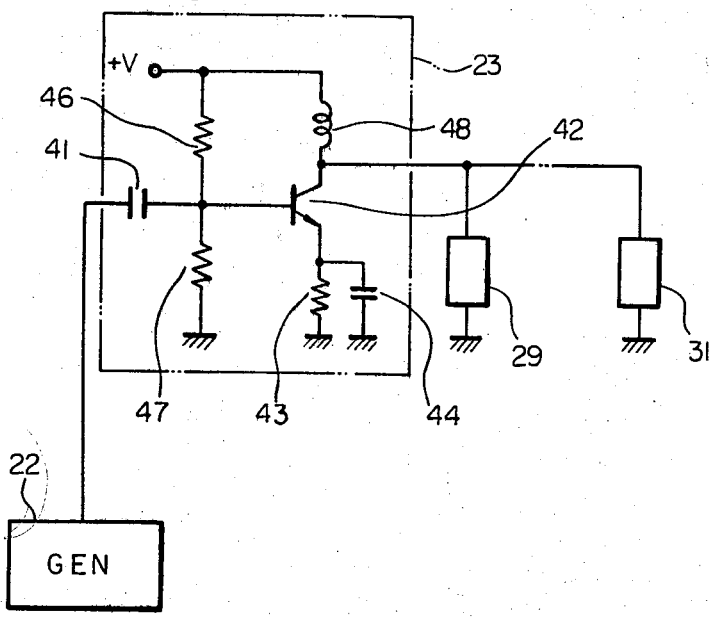
FIG. 4 is an electrical schematic diagram of a first electrical circuit of the present invention.

As shown in FIG. 4, the output signal of the generator 22 is applied through a coupling capacitor 41 of the amplifier 23 to the base of an NPN drive transistor 42. The emitter of the transistor 42 is grounded through the parallel combination of a bias resistor 43 and capacitor 44. Fixed bias is applied to the base of the transistor 42 by a voltage divider consisting of resistors 46 and 47 connected between a positive DC source +V and ground, the junction of the resistors 46 and 47 being connected to the base of the transistor 42. In accordance with an important feature of the present invention, an inductor or coil 48 is connected between the collector of the transistor 42 and the source +V. The vibrators 29 and 31 are connected in parallel between the collector of the transistor 42 and ground. Although only two vibrators 29 and 31 have been described and illustrated, any desired number of vibrators may be connected in parallel as long as they are disposed at the same axial position in the head 12. For example, two more vibrators may be added in a plane perpendicular to the drawing in FIG. 2.

It will be noted that the inductor 48 and the vibrators 29 and 31 constitute a series resonant circuit, since the vibrators 29 and 31 are capacitive elements. In accordance with the principle of the present invention, the signal generated by the generator 22 and amplified by the amplifier 23 which comprises the transistor 42 as an active element has the same frequency as the resonant frequency of the series resonant circuit.

With the vibrators 29 and 31 connected in parallel, they constitute the electrical equivalent of a single capacitor having a capacitance equal to the sum of the capacitances of the vibrators 29 and 31. Where $C_1$ and $C_2$ are the capacitance of the vibrators 29 and 31 respectively, the equivalent capacitance $C_E = C_1 + C_2$. The resonant frequency F of the circuit has the value $$F = \frac{1}{2\pi \sqrt{LC_E}} \quad (1)$$

where L is the inductance of the inductor 48.

In the design of the apparatus 11 the required drive signal frequency for atomization of the ink is first determined experimentally. Then, the size and number of vibrators is selected. The vibrators are connected in parallel and the capacitance thereof measured. Then the value of the inductor 48 is selected to provide a resonant frequency in accordance with equation (1) equal to the frequency of the applied drive signal.

Due to the effect of the resonant circuit, only the drive signal frequency is present across the vibrators 29 and 31 at any significant amplitude. Thus, any distortion introduced in the generator 22 or amplifier 23 is eliminated and the vibrators 29 and 31 are driven in an efficient and stable manner. The design of the amplifier 23 becomes extremely non-critical compared to the prior art.

Figure 5:
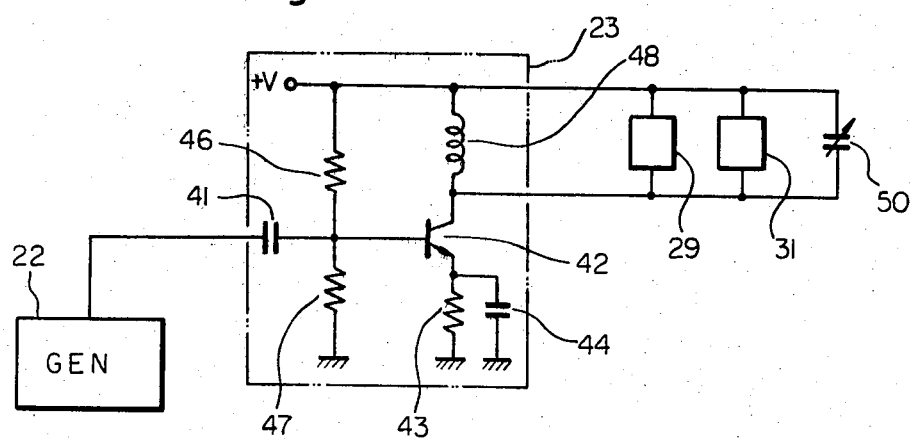
FIG. 5 is an electrical schematic diagram of a second electrical circuit of the present invention.

FIG. 5 shows another embodiment of the present invention in which the vibrators 29 and 31 are connected across the inductor 48 to constitute a parallel resonant circuit. Whereas in the embodiment of FIG. 4 the transistor 42, which constitutes an output element of a signal generator means, is connected across the vibrators 29 and 31, in the embodiment of FIG. 5 the transistor 42 is connected in series with the parallel resonant circuit consisting of the inductor 48 and vibrators 29 and 31. The embodiment of FIG. 5 produces the same effect as the embodiment of FIG. 4.

Figure 3:
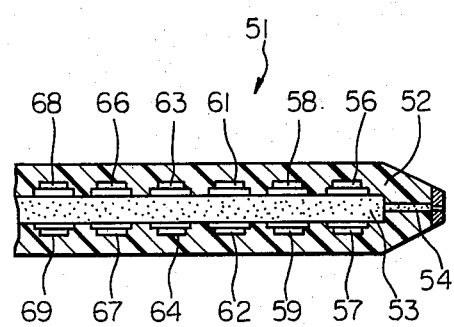
FIG. 3 is a sectional view of an alternative ink ejection head of the present apparatus.

FIG. 3 illustrates another ink ejection head 51 which comprises a body 52 formed with an atomization chamber 53 and a nozzle 54. Six sets of ultrasonic vibrators, 56, 57; 58, 59; 61, 62; 63, 64; 66, 67; and 68, 69; each set having the configuration of the set consisting of the vibrators 29, 31; are provided in an axially spaced arrangement in the atomization chamber 53. Although not illustrated, three of the circuits of FIG. 4 or FIG. 5 are provided to drive the vibrators 56 to 69. One circuit applies a first drive signal to the parallel combination of the vibrators 56, 57, 63 and 64. Another circuit applies a second drive signal, shifted in phase by $2\pi/3$ relative to the first drive signal, to the parallel combination of the vibrators 58, 59, 66 and 67. A third circuit applies a third drive signal, shifted in phase by $4\pi/3$ relative to the first drive signal, to the parallel combination of the vibrators 61, 62, 68 and 69. The phase shift is introduced to compensate for travelling wave effects in the atomization chamber 53. Aside from the phase shifts, the first, second and third drive signals are identical.

Further illustrated in FIG. 5 is a variable capacitor 50 connected in parallel with the vibrators 29 and 31 to provide fine adjustment of the resonant frequency. If desired, the capacitor 50 may be in the form of a varactor which changes capacitance in response to variations in the voltage +V. Naturally, the capacitor 50 may be provided in the embodiment of FIG. 4 in parallel with the vibrators 29 and 31. The capacitor 50 makes it possible to reduce the manufacturing tolerance of the inductor 48 and vibrators 29 and 31 but still adjust the resonant frequency of the circuit to the output frequency of the generator 22.

In summary, it will be seen that the present invention provides an ink jet printing apparatus which accomplishes efficient atomization of ink and therefore high quality printing. Various modifications will become possible for those skilled in the art after receiving the teachings of the present disclosure without departing from the scope thereof. For example, in the circuit of FIG. 5 the variable capacitor 50 may be omitted and the inductor 48 made variable.

What is claimed is:

1. An ink jet printing apparatus including an ink ejection head and a plurality of capacitive ultrasonic vibrators disposed in the ink ejection head for atomizing ink flowing therethrough, characterized by comprising:
   circuit means connecting the ultrasonic vibrators in parallel;
   an inductor connected to the ultrasonic vibrators to form a resonant circuit therewith; and
   signal generator means for applying an alternating electrical signal to the resonant circuit, a frequency of the electrical signal being equal to a resonant frequency of the resonant circuit.

2. An apparatus as in claim 1, in which the inductor is connected in parallel with the ultrasonic vibrators to constitute a parallel resonant circuit therewith.

3. An apparatus as in claim 2, in which the signal generator means is connected in series with the parallel resonant circuit.

4. An apparatus as in claim 1, in which the inductor is connected in series with the ultrasonic vibrators to constitute a series resonant circuit.

5. An apparatus as in claim 4, in which the signal generator means is connected across the ultrasonic vibrators.

6. An apparatus as in claim 1, further comprising a variable capacitor connected in parallel with the ultrasonic vibrators.

7. An apparatus as in claim 6, in which the variable capacitor is a varactor.

* * * * *